US008937570B2

(12) United States Patent
Sheen

(10) Patent No.: US 8,937,570 B2
(45) Date of Patent: Jan. 20, 2015

(54) APPARATUS FOR SYNTHETIC IMAGING OF AN OBJECT

(71) Applicant: Battelle Memorial Institute, Richland, WA (US)

(72) Inventor: David M. Sheen, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 272 days.

(21) Appl. No.: 13/629,849

(22) Filed: Sep. 28, 2012

(65) Prior Publication Data

US 2014/0091965 A1 Apr. 3, 2014

(51) Int. Cl.
*G01S 13/00* (2006.01)
*H01Q 21/08* (2006.01)
*H01Q 21/00* (2006.01)
*H01Q 21/06* (2006.01)
*G01S 13/90* (2006.01)

(52) U.S. Cl.
CPC .............. *G01S 13/90* (2013.01); *H01Q 21/061* (2013.01)
USPC ..... 342/25 R; 342/25 A; 342/25 C; 342/25 F; 342/175; 343/824; 343/844

(58) Field of Classification Search
CPC ................ G01S 13/90–13/9094; H01Q 21/00; H01Q 21/06–21/068
USPC ....... 342/25 R, 25 A, 25 B, 25 C, 25 D, 25 E, 342/25 F, 175; 343/824, 844
See application file for complete search history.

(56) References Cited

U.S. PATENT DOCUMENTS

| | | | |
|---|---|---|---|
| 5,537,367 A * | 7/1996 | Lockwood et al. | 367/87 |
| 5,546,357 A * | 8/1996 | Zehner | 367/88 |
| 6,937,191 B2 * | 8/2005 | Puente Baliarda | 343/700 MS |
| 6,970,133 B2 * | 11/2005 | Chandler | 343/700 MS |
| 7,034,740 B2 * | 4/2006 | Witten | 342/22 |
| 7,151,482 B2 * | 12/2006 | Natsume et al. | 342/147 |
| 7,525,479 B2 * | 4/2009 | Nagai | 342/158 |
| 7,548,185 B2 * | 6/2009 | Sheen et al. | 342/70 |
| 7,579,982 B2 * | 8/2009 | Matsuoka | 342/196 |
| 7,928,897 B2 * | 4/2011 | Ishii et al. | 342/105 |
| 8,482,476 B2 * | 7/2013 | Yanagihara et al. | 343/844 |
| 8,624,775 B2 * | 1/2014 | Inami et al. | 342/107 |
| 2003/0076254 A1* | 4/2003 | Witten | 342/22 |
| 2004/0027305 A1* | 2/2004 | Pleva et al. | 343/853 |
| 2004/0051667 A1* | 3/2004 | Ro et al. | 343/700 MS |
| 2004/0257265 A1 | 12/2004 | Gottwals | |
| 2004/0257625 A1* | 12/2004 | Tonami | 358/3.28 |

(Continued)

OTHER PUBLICATIONS

International Search Report/Written Opinion for International Application No. PCT/US2013/051970, International Filing Date Jul. 25, 2013, Date of Mailing Apr. 7, 2014.

(Continued)

*Primary Examiner* — Peter Bythrow
(74) *Attorney, Agent, or Firm* — A. J. Gokcek

(57) ABSTRACT

An apparatus for synthetic imaging of an object is disclosed. The apparatus includes a plurality of transmitter elements spaced apart by a first distance in a first column and a plurality of receiver elements spaced apart by a second distance in a second column. The first distance and the second distance are different. The plurality of transmitter elements is a non-integer multiple of the plurality of receiver elements, and the plurality of receiver elements is a non-integer multiple of the plurality of transmitter elements.

19 Claims, 19 Drawing Sheets

(56) References Cited

U.S. PATENT DOCUMENTS

| | | | | |
|---|---|---|---|---|
| 2005/0280572 A1* | 12/2005 | Shima | | 342/70 |
| 2008/0100510 A1* | 5/2008 | Bonthron et al. | | 342/373 |
| 2009/0135078 A1* | 5/2009 | Lindmark et al. | | 343/844 |
| 2009/0267863 A1* | 10/2009 | Baliarda et al. | | 343/893 |
| 2011/0063158 A1* | 3/2011 | Kondou | | 342/27 |
| 2012/0032839 A1* | 2/2012 | Burri et al. | | 342/25 F |
| 2012/0133569 A1* | 5/2012 | Pivit et al. | | 343/844 |
| 2012/0201097 A1* | 8/2012 | Fox | | 367/87 |
| 2012/0262359 A1* | 10/2012 | Baliarda et al. | | 343/844 |
| 2014/0009357 A1* | 1/2014 | Tiezzi et al. | | 343/844 |
| 2014/0091965 A1* | 4/2014 | Sheen | | 342/25 A |

OTHER PUBLICATIONS

Sheen, D. M., et al., Weapon detection using a wideband millimeter-wave linear array imaging technique, Proceedings of SPIE, vol. 2092, 1993, 536-547.

Sheen, D. M., et al., Cylindrical millimeter-wave imaging technique for concealed weapon detection, Proceedings of SPIE, vol. 3240, 1997, 242-250.

Sheen, D. M., et al., Combined illumination cyclindrical millimeter-wave imaging technique for concealed weapon detection, Proceedings of SPIE, vol. 4032, 2000, 52-60.

Sheen, D. M., et al., Three-Dimensional millimeter-wave imaging for concealed weapon detection, IEEE Transactions on Microwave Theory and Techniques, vol. 49, 2001, 1581-1592.

Sheen, D. M., et al., Cylindrical millimeter-wave imaging technique and applications, Proceedings of SPIE, vol. 6211, 2006, 62110A1-62110A-10.

Sheen, D. M., et al., Near field imaging at microwave and millimeter wave frequencies, IEEE MTT-S International Microwave Symposium Digest, 2007, 1693-1696.

Sheen, D. M., et al., Near-field three-dimensional radar imaging techniques and applications, Applied Optics, vol. 49, 2010, E83-E93.

* cited by examiner

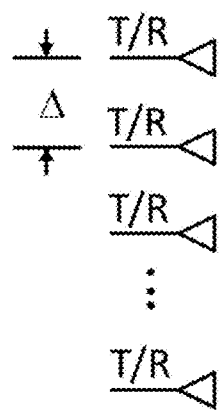
Figure 1 – Prior Art
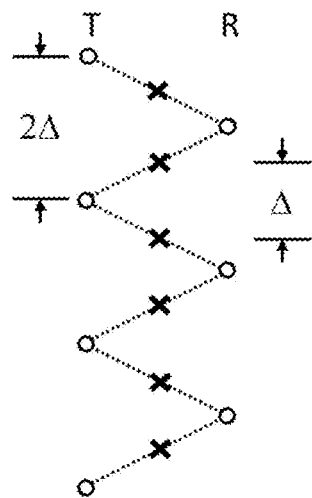
Figure 2 – Prior Art

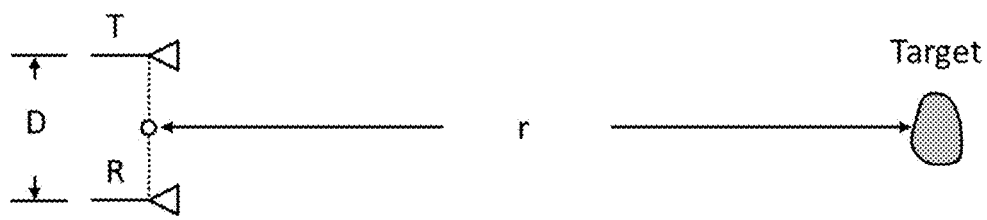
Figure 3 – Prior Art
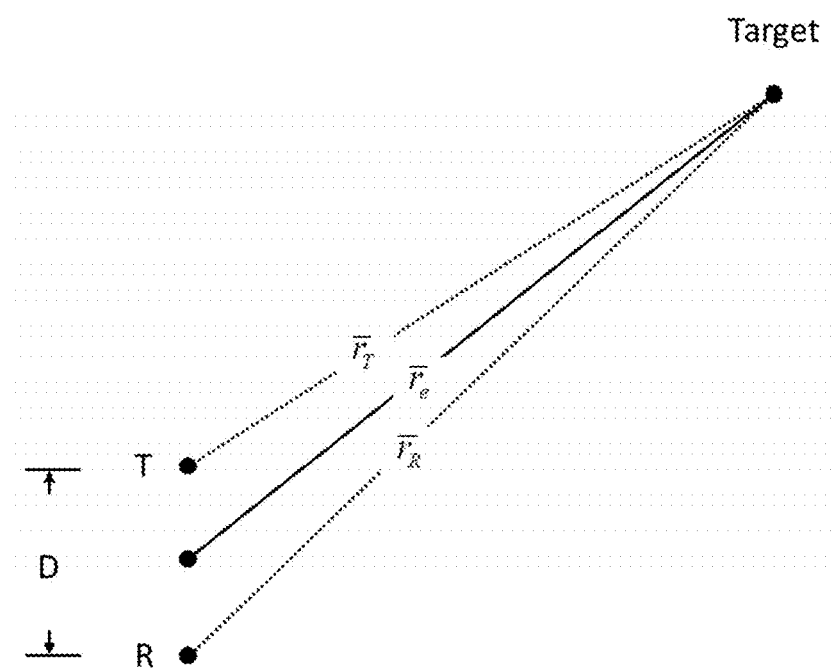
Figure 4 – Prior Art

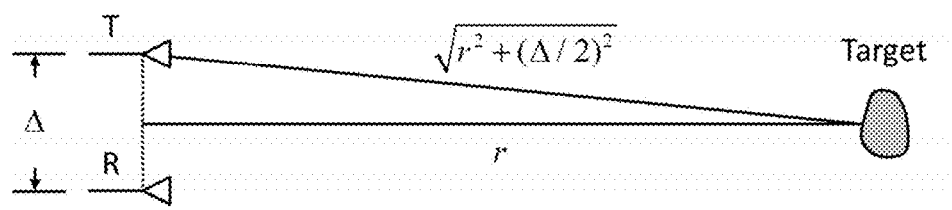
Figure 5 – Prior Art

APPARATUS FOR SYNTHETIC IMAGING OF AN OBJECT

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to synthetic imaging. More specifically, this invention relates to a synthetic imaging apparatus that provides dense uniform sampling and increased imaging performance with low artifact levels for arrays with moderate baseline spacing and fewer numbers of transmitters and/or receivers.

BACKGROUND OF THE INVENTION

Microwave and millimeter-wave holographic or synthetic aperture imaging techniques have been developed for a wide variety of applications. These applications include concealed weapon detection, radar cross-section (RCS) imaging, ground penetrating radar (GPR), through-wall and inner wall imaging, and non-destructive evaluation. The imaging techniques developed are fully three-dimensional and typically operate by scanning a wide bandwidth radar transceiver over a planar or cylindrical aperture, and using mathematical techniques to focus the data into a three-dimensional image. It is advantageous to use mathematical focusing for these applications because it allows for the use of large apertures and extreme near-field operation, where it would be inconvenient or impossible to use physical focusing elements such as lenses or reflectors. Additionally, scanning the transmitter along with the receiver doubles the resolution relative to fixed transmitters and provides superior illumination quality by using a large diversity of transmitter positions.

Many near-field radar imaging applications require real-time or near-real-time data collection and imaging. Sequentially-switched linear array technology that allows one dimension of a planar or cylindrical aperture to be effectively scanned electronically at high speed has been developed. This is accomplished by sequencing through each element or transmit and receive pairs using microwave or millimeter-wave switching networks connected to the radar transceiver. Mechanical scanning along the dimension orthogonal to the array axis then completes the sampling of a two-dimensional cylindrical or planar aperture. These data can then be reconstructed using, for example, wideband holographic imaging algorithms.

Linear Array Sampling Techniques

The most direct and obvious method of scanning along the array axis is to assume that each antenna is placed uniformly along the axis of the linear array, and can function simultaneously as a transmitter and receiver. This scenario is depicted in FIG. 1. A switching network is used to sequentially select each antenna element and then use it to transmit and receive the wideband microwave/millimeter-wave signal. An antenna spacing of $\Delta$ results in an effective spatial sample spacing of $\Delta$. While conceptually simple, this technique has a number of drawbacks. First, the antennae must be spaced very closely, usually on the order of one-half wavelength ($\lambda/2$) at the center frequency in order to satisfy the spatial sampling criterion on the aperture. This forces the antennae to be very small, and therefore low-gain, and will frequently cause antenna coupling problems between adjacent or neighboring antennae. An additional problem is that the microwave/millimeter-wave transceiver must be capable of separating the transmit signal from the receive signal. This is possible using directional couplers or circulators, however, these introduce additional losses and do not perfectly isolate the weaker received signal from the much stronger transmitted signal.

A more practical and effective technique separates the system into two linear arrays. One array is dedicated as a transmit array, and the other array is dedicated as a receive array. The transmit and receive arrays have an element spacing of $2\Delta$ and are offset from each other by $\Delta$ as shown in FIG. 2. A transmit and receive antenna pair approximately sample the spatial point located half-way between the phase centers of each antenna. This approximation is valid assuming that the transmit-receive antenna spacing is much less than the distance to the scattering target. The array is sequentially sampled by switching on the first transmit antenna and the first receive antenna and collecting the first spatial sample. The second transmit antenna can then be switched on and the second sample collected (with the first receive antenna still switched on). The second receive antenna is then switched on (with the second transmit antenna still on) to collect the third spatial sample. This process is then continued across the array. The switching scheme is described in FIG. 2 in the following way. Dotted lines are used to indicate individual pairs of transmit/receive antennas and x's are used to indicate the locations of the effective spatial sampling positions. This configuration has a number of advantages over the configuration shown in FIG. 1. Antennas are dedicated to be either transmitters or receivers, so no duplexing is required in the transceiver. Antenna spacing of $2\Delta$ results in an effective sample spacing of $\Delta$. This allows for larger antennae to be utilized and reduces the coupling between the antennae. Additionally, this design allows amplifiers to be placed within the switching network to compensate for switching losses, which is not readily accomplished if each element must act as both a transmitter and a receiver. To acquire N spatial samples requires approximately N antennae total (N/2 transmit and N/2 receive). This sampling technique is very effective and has been incorporated into many systems.

Quasi-Monostatic Approximation

Implicit in the development of the linear array sampling technique described by FIG. 2 is the quasi-monostatic approximation. This approximation is that separate transmit and receive antennas placed near each other effectively operate as a single transmit-receive (TR) antenna placed at the midpoint of the line joining the phase centers of each antenna. This approximation is illustrated in FIG. 3, and requires that the range (r) is much greater than the separation of the antennas (D). This approximation introduces a path length or phase error that is not usually significant for the array architecture described in FIG. 2, but will be more significant for the multi-static array architecture developed in this paper. This error is simply due to the round-trip path length difference between the path emanating from the mid-point versus the actual round-trip path. For the general configuration shown in FIG. 4, this path length error is $$\Delta l = r_T + r_R - 2r_e \quad (1)$$

This error is dependent on the separation of the antennas and the range and position (angle) to the target. In general, the target position cannot be known prior to imaging, so this error cannot be completely corrected, however, as described later in this section, the error can be largely removed by approximating the direction of wave propagation as being along the antenna axes. For the configuration shown in FIG. 5, the error is $$\Delta l = 2\left(\sqrt{r^2 + (\Delta/2)^2} - r\right) \square \frac{1}{8}\left(\frac{\Delta}{r}\right)^2 \quad (2)$$

which is small for $\Delta \square r$. In many cases this error can be made small, and in the array configuration shown in FIG. 2, this error is insignificant because it is identical for each effective sample location and therefore does not affect focusing. In this case, only a very slight range position error might be observed.

Interlaced Linear Array Sampling Technique

The sampling technique described above and shown in FIG. 2 is very effective, however, it is very desirable to reduce the number of antenna elements required to sample the width/height of the aperture. The number of samples needed is determined by Nyquist sampling requirements, however, the number of antenna elements can be reduced using special sampling techniques that exploit the quasi-monostatic approximation by using multiple receivers for each transmitter (or vice-versa). One sampling technique uses the same configuration as in FIG. 2, except that the receive array has been thinned by removing every other receive antenna element, as shown in FIG. 6. Each receiver is now used in conjunction with four nearest transmit antenna elements, as shown in the FIG. 6 (dotted lines indicate antenna pairings, and short lines indicate effective sample locations). This results in the same effective sample spacing and density as in the conventional separate transmit and receive array sampling technique described in FIG. 2, however the number of receive elements has been reduced by approximately one-half Therefore collection of N spatial samples would require approximately 3N/4 physical antenna elements. Note that this technique would work equally well with the transmit array thinned, rather that the receive array. This technique can be extended by further reducing the number of receive elements by again removing half of the receivers. This thinning process could be continued to the extreme case where the only receiver elements remaining are the ones located near the ends of the linear array. This extreme configuration would likely not work very well due to the abrupt jump in illumination from the left side of the array to the right side of the array, and due to violation of the assumption that the separation between the transmit and receive antennas is much less that the distance to the imaging target.

A prior invention, U.S. Pub No. 2007/0075889, further developed this method to establish an interlaced sampling linear array sampling technique. In one embodiment of this publication, a single array of transmit antennas is placed between two receive antenna arrays. In this embodiment, as shown in FIG. 5 of the 2007/0075889 publication, each transmit antenna is used in conjunction with the four nearest receivers, two from the upper array (R1) and two from the lower array (R2). Sampling using the transmit array and the R1 receive array results in the samples indicated by the left column x's and sampling using the transmit array and the R2 receive array results in the samples indicated by the right column of x's.

Note that the left and right effective sample columns are offset vertically from each other by $\Delta/2$, and laterally by an amount equal to the horizontal spacing of R1/R2 from the transmit array (D). Since a linear mechanical scan is assumed to complete the scanning of the rectilinear or cylindrical aperture, these offset effective sample locations can be made to align at slightly offset times during the mechanical scan. For example, the transmit array can be sequenced using the R2 receive array to collect the sample locations shown in the right column, then when the array has moved right a distance D, the transmit array can be sequenced using the R1 receive array to collect the sample locations shown in the left column superimposed over the previously collected samples. Thus, the effective sample spacing is $\Delta/2$. The advantage of this system is that collection of N spatial samples requires only approximately N/2 physical antenna elements. This reduces the number of antennas required by approximately one-half compared with the technique described in FIGS. 1 and 2. An additional advantage is that the physical separation of the antennas is larger for a given effective sample spacing, which will allow greater antenna gain and/or greater isolation between antennas. Clearly, the R1 and R2 receive arrays could also be thinned (as in the FIG. 4 configuration) to further reduce the number of antenna elements required.

The thinned-receiver array and interlaced linear array sampling techniques described above provide a powerful means of reducing the number of antennas needed to uniformly sample a linear axis. This reduction is approximately a factor of 2 for the interlaced technique. While powerful, this technique has two primary limitations. First the reduction in the antennas needed is limited. Additional thinning of the receive arrays can reduce this somewhat, however, the transmit array needs to maintain a spacing of $2\Delta$ for effective sampling of $\Delta/2$, which limits the reduction in the number of antennas. The technique does not provide a systematic way to continue to reduce the number of antennas required to densely sample the array axis. An additional concern in some cases is that the technique uses two effective or virtual columns, and relies on mechanical motion to overlay the two sample columns. This is an additional complexity that may not be possible or desirable for many imaging system designs.

What is needed is an improved apparatus for synthetic imaging of an object.

SUMMARY OF THE INVENTION

In one embodiment of the present invention, an apparatus for synthetic imaging of an object is disclosed. The apparatus includes a plurality of transmitter elements spaced apart by a first distance in a first column; and a plurality of receiver elements spaced apart by a second distance in a second column, such that the first distance and the second distance are different. The plurality of transmitter elements is a non-integer multiple of the plurality of receiver elements and the plurality of receiver elements is a non-integer multiple of the plurality of transmitter elements.

In one embodiment, the plurality of transmitter elements and the plurality of receiver elements are repeated as a group every unit cell length in a periodic fashion. This periodicity achieves uniform sampling across each unit cell length. Further, samples obtained by the transmitter elements and the receiver elements are tightly spaced by a fraction of a wavelength. Each transmitter element in the first column is spaced apart a distance approximately equal to the unit cell length divided by the number of transmitter elements, and each receiver element in the second column is spaced apart a distance approximately equal to the unit cell length divided by the number of receiver elements.

In one embodiment, the elements operate in the 200 MHz-1 THz range. The elements electronically scan one line of a planar or cylindrical aperture. The aperture is approximately two meters in height, but can be longer or shorter.

Each transmitter element and each receiver element may be used multiple times to obtain multiple samples per unit cell.

In another embodiment of the present invention, an apparatus for synthetic imaging of an object is disclosed. The apparatus includes a plurality of transmitter elements spaced apart by a first distance in a first column. The apparatus also includes a plurality of receiver elements spaced apart by a second distance in a second column. The first distance and the second distance are different. The apparatus further includes a single column of effective samples obtained by the transmitter elements and the receiver elements. The plurality of transmitter elements and the plurality of receiver elements are repeated as a group every unit cell length in a periodic fashion. The periodicity achieves uniform sampling across each unit cell length.

In another embodiment of the present invention, a method of synthetic imaging of an object is disclosed. The method includes providing a plurality of transmitter elements spaced apart by a first distance in a first column. The method further includes providing a plurality of receiver elements spaced apart by a second distance in a second column. The method also includes obtaining a single column of effective samples by the transmitter elements and the receiver elements; repeating as a group the plurality of transmitter elements and the plurality of receiver elements every unit cell length in a periodic fashion; and achieving uniform sampling across each unit cell length.

In another embodiment of the present invention, an apparatus for synthetic imaging of an object is disclosed. The apparatus includes a plurality of transmitter elements spaced apart uniformly in a first spatial dimension and a second spatial dimension. The apparatus also include a plurality of receiver elements spaced apart uniformly in the first spatial dimension and the second spatial dimension, such that the uniform spacings of the receiver elements are different from the uniform spacings of the transmitter elements.

In one embodiment, the first spatial dimension corresponds to the X-direction of a two-dimensional array, and the second spatial dimension corresponds to the Y-direction of the two-dimensional array.

In one embodiment, the plurality of transmitter elements and the plurality of receiver elements are repeated in both the X-dimension and the Y-dimension, wherein the periods are set by the number of unit cells in each dimension. In one embodiment, at least one transmitter element and receiver element are co-located at vertices of each unit cell.

BRIEF DESCRIPTION OF THE DRAWINGS

FIG. 1 illustrates uniformly spaced transceiver array sampling.

FIG. 2 illustrates separate transmit and receive array sampling.

FIG. 3 illustrates effective transceiver location for quasi-monostatic operation placed at the midpoint of the line joining the phase centers of each antenna.

FIG. 4 illustrates path length vectors in the quasi-monostatic approximation.

FIG. 5 illustrates the error in the quasi-monostatic approximation.

DETAILED DESCRIPTION OF THE PREFERRED EMBODIMENTS

The present invention is directed to apparatuses for and methods of synthetic imaging of an object. Advantages and benefits of the present invention compared to the prior art include the following. The present invention reduces the number of transmit and receive antennas required to densely sample a linear axis. The present invention also provides a single column of virtual samples. In addition, the present invention maintains dedicated transmitters and receivers, ideally as separate columns of a two column array.

The present invention allows antennas that may be up to several wavelengths wide in both cross-sectional dimensions. This may require that both transmit and receive arrays are reduced in antenna count.

The present invention provides uniform spatial effective sampling, which may be needed for low-artifact imaging and Fourier Transform-based image reconstruction. The present invention further provides dense sub-wavelength effective sampling, which may be necessary to prevent spatial aliasing during image reconstruction. The present invention also provides numerous transmitter locations for angularly diverse illumination of the target.

Another advantage of the present invention is that it does not require extreme separation of transmit and receive antenna locations used for effective sampling. The present invention also allows operation in the near-field of the antenna array.

Figure 6:
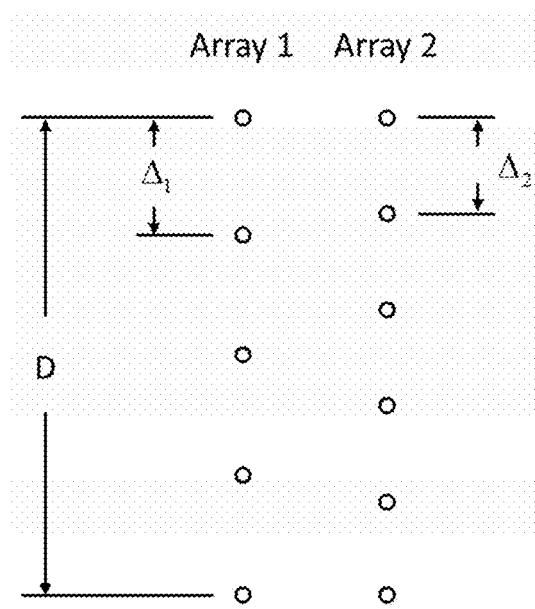
FIG. 6 illustrates a multi-static linear array configuration, in accordance with one embodiment of the present invention.

FIG. 6 illustrates a multi-static linear array configuration, in accordance with one embodiment of the present invention, using two linear arrays or columns with unique spacing intervals. In the embodiment of FIG. 6, it is assumed without loss of generality that $\Delta_1 > \Delta_2$ and that one array (column) is dedicated to transmit and the other array to receive. It is assumed that the spacings may be such that the antenna placements between the two arrays are periodic and repeat over an interval D. The interval D is designated the unit cell length. As will be explained below, this periodicity requirement achieves uniform sampling over most of the array length, but is not specifically a requirement of this sparse multi-static array concept.

Figure 7:
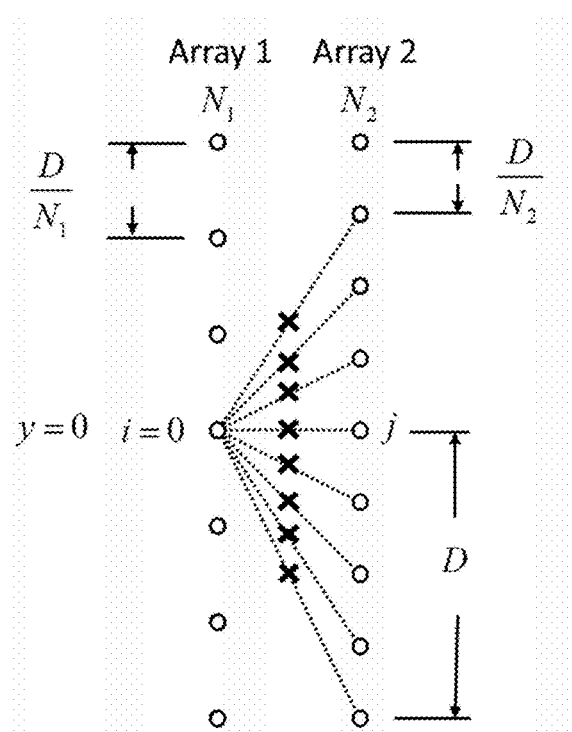
FIG. 7 illustrates multi-static array configuration effective sampling analysis, in accordance with one embodiment of the present invention.

FIG. 7 illustrates multi-static array configuration effective sampling analysis, in accordance with one embodiment of the present invention. In this analysis, the left array, Array 1, has $N_1$ elements over unit cell length D for a spacing of $D/N_1$. The right array, Array 2, has $N_2$ elements over unit cell length D for a spacing of $D/N_2$. For this analysis both arrays are assumed to be infinite above and below the portion under analysis, so that any array elements needed for effective sampling are available. To meet the constraint, in one embodiment, that the transmit and receive separation not be too large, only separations of $\leq D$ are used. The effective samples for this configuration ($N_1=3$, $N_2=4$ is shown) there are $2N_2$ effective samples available from the single Array 1 location used. Larger separations could be used, however, these will result in redundant sampling for periodic arrays.

For a vertical y-axis, the effective sample locations are at $$y_{ij} = \frac{1}{2}\left(i\frac{D}{N_1} + j\frac{D}{N_2}\right) \tag{3}$$

where $iD/N_1$ can be considered to be an offset due to the selection of the Array 1 element and $jD/N_2$ can be considered to be the primary sample locations due to the sequencing of the array 2 locations (there are $2N_2$ of these per unit cell distance D).

To achieve the objective of uniform dense sampling, the offset ($iD/N_1$) should uniformly shift through the effective sampling increment of the primary samples. The array is assumed to be infinite, or at least extend one additional unit cell length beyond the region under analysis, therefore only the portion of the offset that is the remainder after division by the primary sampling interval ($D/N_2$) is important. Another consideration is that redundancy is undesirable, so effective samples with the shortest baseline separation are usually preferred. Unique (non-redundant) samples are located at:

$$y_{ij} = \text{mod}\left(\frac{iD}{2N_1}, \frac{D}{2N_2}\right) + j\frac{D}{2N_2} \tag{4}$$

$$= \frac{D}{2N_2}\left(\text{mod}\left(\frac{iN_2}{N_1}, 1\right) + j\right)$$

Without restricting the generality of the technique it is assumed that:
1. $N_2 > N_1$
2. $N_1$ and $N_2$ have no common factors (if they did it would reduce the unit cell length, and D, $N_1$ and $N_2$ would simply be redefined)
3. i varies over a single unit cell length, i.e. it covers the integers $i \in [-N_1/2, \ldots, -1, 0, 1, \ldots, N_1/2)$
4. j varies over as much of the array as required (found to be such that the Array 2 position only varies within $\pm D$ of the selected i element).

As an example of the sampling positions available, for $N_1=5$ and $N_2=7$, the Array 1 index will vary over the integers $i \in [-2, -1, 0, 1, 2]$. The mod function above evaluates to ⅕, ⅗, 0, ⅖, ⅘, which results in uniform sampling, and an increase in the sampling density of a factor of $N_1=5$.

In general, the mod function and variation of the Array 1 index results in unique samples available at positions:

$$y_{ij} = \frac{D}{2N_2}\left(j + \frac{i}{N_1}\right) \tag{5}$$

with uniform effective sampling at an increment of:

$$\Delta y = \frac{D}{2N_1 N_2} \tag{6}$$

The number of effective samples per unit cell length is:

$$N_{samples} = 2N_1 N_2 \tag{7}$$

and the number of antennas per unit cell length is:

$$N_{antennas} = N_1 + N_2 \tag{8}$$

A convenient figure of merit for the sparse multi-static array is the number of samples divided by the number of antennas $$\frac{N_{samples}}{N_{antennas}} = \frac{2N_1 N_2}{N_1 + N_2} \tag{9}$$

This figure of merit is maximized for large $N_1$ and $N_2$ that are close to each other in value, e.g. $N_1=8$ and $N_2=9$. For many cases it is convenient to let $N_2 = N_1 + 1$ as this will make $N_1$ and $N_2$ close to each other while having no common factors. For this special case the figure of merit is slightly larger than $N_1$. So, for the example above the number of samples per antenna will exceed 8. This allows a radical decrease in the number of antennas and switches required to build a dense, uniformly sampled linear array.

Finite Sparse Multi-Static Arrays

Figure 8:
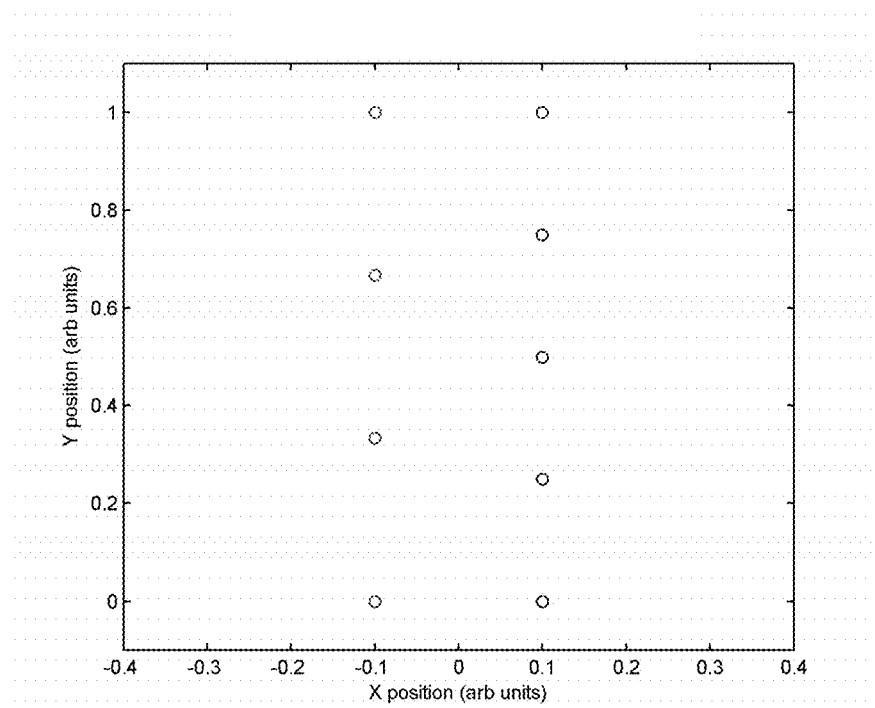
FIG. 8 is a layout of a single unit cell of a 3:4 array, in accordance with one embodiment of the present invention.

Finite arrays can be specified by designating the length of the array L, number of unit cells $N_c$, $N_1$ and $N_2$. For convenience a specific array design will be designated by $N_1:N_2:N_c$. An example 2:3:3 array is shown in FIG. 8. For symmetry of the arrays, ending elements are included in both arrays such that $$N_{array1} = N_1 N_c + 1 \tag{10}$$

$$N_{array2} = N_2 N_c + 1 \tag{11}$$

$$D = \frac{L}{N_c} \tag{12}$$

$$\Delta_1 = \frac{D}{N_1} \tag{13}$$

$$\Delta_2 = \frac{D}{N_2} \tag{14}$$

It is tedious to specify the particular element combinations that result in optimal, uniform, non-redundant sampling for finite sparse multi-static arrays. However, it is straightforward to determine the element pairings systematically using a computer algorithm. A simple design algorithm that determines the element pairings and effective sample positions is given below as one embodiment of the present invention.

Sparse multi-static array design algorithm:
1. Specify array length, L.
2. Specify the design of the array $N_1:N_2:N_c$
3. Calculate the Array 1 and Array 2 antenna locations:

$$y_1^i = (i-1)\frac{N_1}{D} \text{ for } i \in [1, 2, \ldots, N_{array1}] \quad (15)$$

$$y_2^j = (j-1)\frac{N_2}{D} \text{ for } j \in [1, 2, \ldots, N_{array2}] \quad (16)$$

4. Compute all possible effective sample positions:

$$y_e^{i,j} = \frac{y_1^i + y_2^j}{2} \quad (17)$$

5. Eliminate all samples that have antenna separation baselines greater than D, i.e. ensure that:

$$y_1^i - D \leq y_2^j < y_1^i + D \quad (18)$$

6. Sort the effective sample positions into ascending order with tables of Array 1 and Array 2 indices (i and j) likewise sorted by ascending $y_e^{i,j}$ order.

Note that specifying $y_1^i - D \leq y_2^j < y_1^i + D$ eliminates redundant sampling in the array.

All unit cells in the array will have complete and uniform sampling except for the first and last cells, which, depending on the specific design have approximately half of the cell uniformly sampled (the half towards the center of the array).

Figure 9:
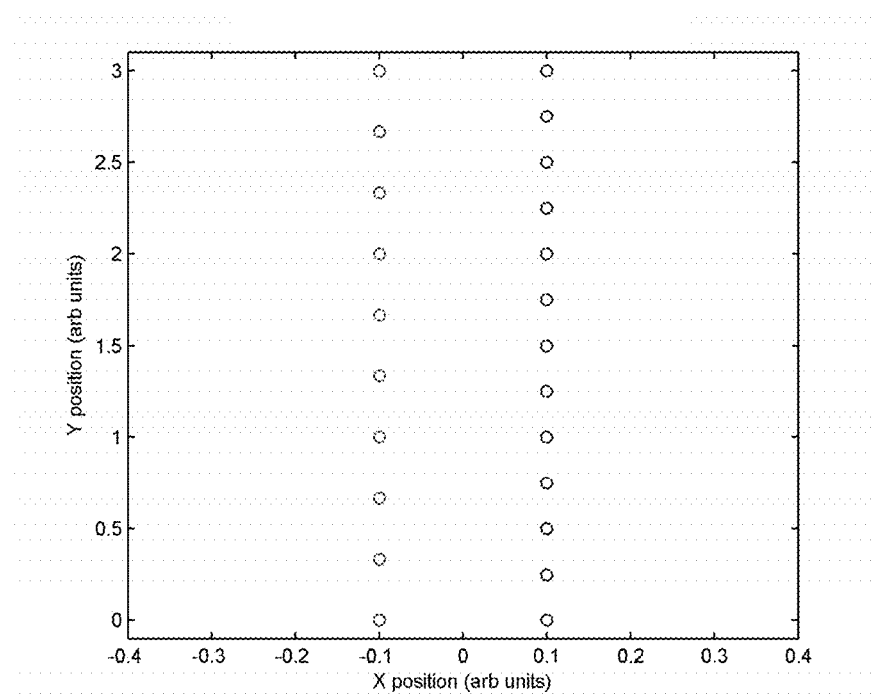
FIG. 9 is a layout of a single unit cell of a 3:4:3 array, in accordance with one embodiment of the present invention.
Figure 10:
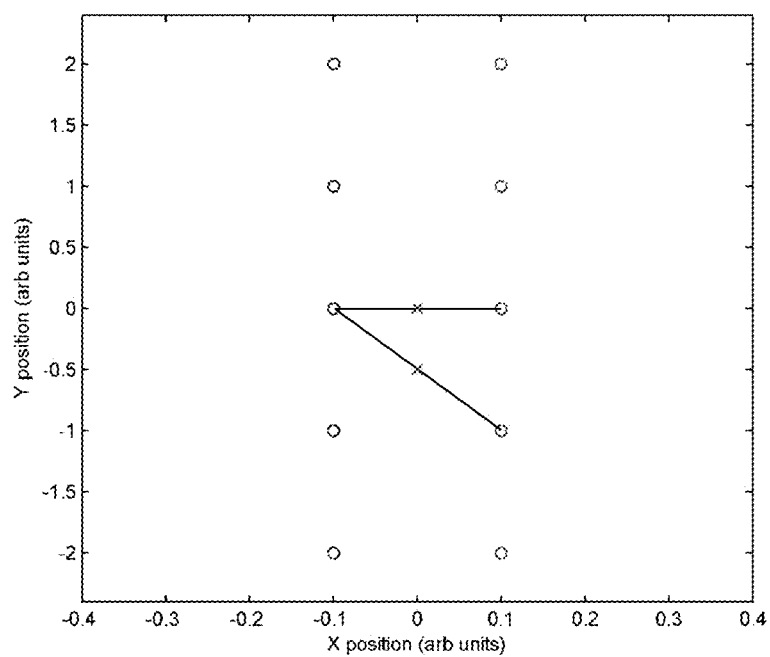
FIG. 10 illustrates effective sampling for a 1:1 array single unit cell.
Figure 11:
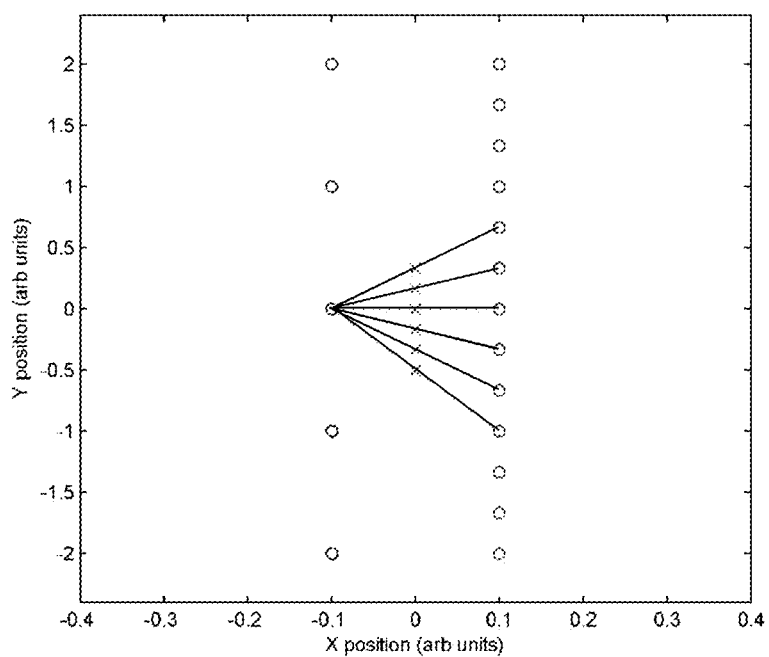
FIG. 11 illustrates effective sampling for a 1:3 array single unit cell, in accordance with one embodiment of the present invention.
Figure 12:
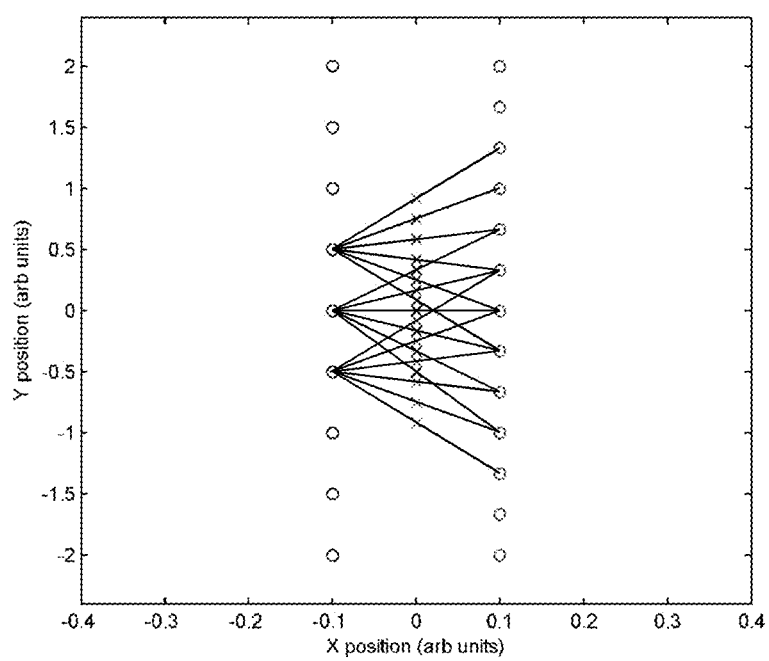
FIG. 12 illustrates effective sampling for a 2:3 array single unit cell, in accordance with one embodiment of the present invention.
Figure 13:
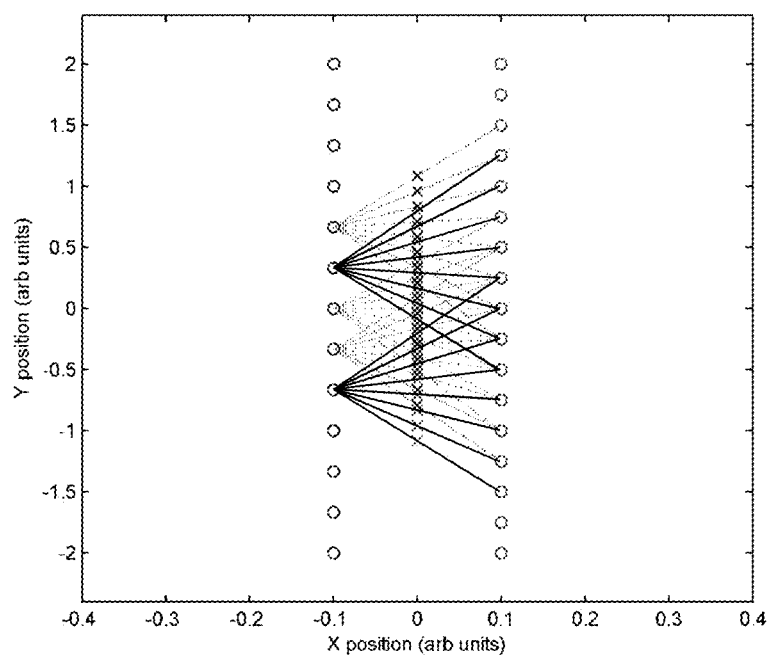
FIG. 13 illustrates effective sampling for a 3:4 array single unit cell, in accordance with one embodiment of the present invention.

Embodiments of this algorithm and of the sampling characteristics of the sparse multi-static array are shown in FIGS. 8-13. A single unit cell of a 3:4 array is shown in FIG. 8 and three unit cells are shown in FIG. 9. These figures illustrate the spacing and the periodicity of the arrays. The simplest type of array is a 1:1 array. This type of array violates the conditions stated above that $N_2 > N_1$ and that the numbers not share any common factors, so it will be considered a special limiting case. The unique samples for a single unit cell are shown in FIG. 10. This array is essentially equivalent to the separated transmit and receive array shown in FIG. 2, except for the shift in alignment of the two columns. This shift does not change the sampling density, but does make the two antenna pair baselines equal. A more complex 1:3 array is shown in FIG. 11 with the sampling for a single unit cell shown. Similarly, FIG. 12 shows a 2:3 array and FIG. 13 shows a 3:4 array. Note that in both these figures the sampling shown is uniform within a single unit cell (−0.5≤y<0.5). The sampling outside of this region will be uniform as additional antenna pairings that were not shown are included. In all cases shown, the sampling is uniform within the unit cell and the number of samples is $2N_1N_2$.

An important issue for the implementation of the sparse multi-static array concept for imaging applications is that there will be significant path length differences between effective transceiver samples due to the variable baseline separation of the paired transmit and receive antennas. This path difference (error) was analyzed above in the discussion of the quasi-monostatic approximation. Restricting the baseline separations to be so small that the quasi-monostatic approximation is valid without any mitigation would render the multi-static array technique only marginally effective since it relies on relatively large baselines to achieve the reduced antenna counts. The path length differences can be compensated using (at least) two different techniques:

1. Array calibration techniques that essentially range or phase-shift the transceiver data to remove much of the error
2. Generalized focusing techniques that use the actual path lengths rather than relying on the approximate path lengths The array calibration techniques are more approximate because they must assume a direction of wave travel in order to estimate the path error. Typically, an on-axis propagation direction is assumed, which will work well for most cases, but may produce poor results in extreme near-field imaging conditions, or for arrays with very large baseline separations (i.e. large $N_1$ or $N_2$).

Imaging Performance Results

The imaging performance of the sparse multi-static array technique can be demonstrated using phase history data that is synthesized. This synthesized data can then be reconstructed using at least two techniques.

First, the range-domain multi-static generalized synthetic aperture focusing technique (RD-GSAFT) is applied. This technique uses the precisely known locations of each transmit and receive antenna in a phase-conjugate matched filtering method and is expected to perform the image reconstruction with the least imaging artifacts and highest dynamic range. This technique performs a coherent summation of the measured phase-history response multiplied by the expected response due to a hypothetical point scatter located at each image pixel or voxel. If an actual scatterer exists, then terms in this summation tend to add coherently producing a substantial response, whereas if there is no scatterer the terms tend to add incoherently and produce a minimal response.

Second, the computed phase-history data can be adapted to match the requirements for quasi-monostatic linear synthetic aperture imaging, or synthetic aperture radar (SAR) technique. This technique assumes that a quasi-monostatic transceiver samples a linear synthetic aperture with uniform spacing along the aperture. SAR data can be reconstructed using a standard Fourier Transform-based image reconstruction algorithm as described by Soumekh, M. Soumekh, *Fourier Array Imaging*, Englewood Cliffs, N.J.; Prentice Hall, 1994, or by Sheen, Sheen et al., "Three-dimensional millimeter-wave imaging for concealed weapon detection," *IEEE Transactions on Microwave Theory and Techniques*, vol. 49, pp. 1581-92, 2001. The sparse multi-static array technique approximately meets these requirements if the phase history data is conditioned prior to image reconstruction. Specifically, some of the samples near the ends of the array will not be uniformly sampled, and an array calibration technique must be applied to reduce the path length (phase) error due to the varying transmit-receive baseline spacing inherent in the sparse array technique. This calibration cannot be exact, because the error defined by equation (2) above is dependent on the presumably unknown location of the scatterer both in range and angle. However, excellent results over a reasonably wide field of view can be obtained by choosing the range to the center of the image and assuming that the scatterers are nominally on-axis with the midpoint of the TR antenna pair. In this case, the phase history data can be calibrated by multiplying each frequency waveform by a calibration waveform that effectively range (phase) shifts the data to compensate for the range (phase) error, $$V_{cal} = e^{-jk\Delta l} \quad (19)$$

where $\Delta l$ was defined by (2) above.

Phase history data is synthesized for several different array types with the following parameters:
  Array length 2.5 m
  Range: 2.50-5.00 m
  Targets: Letter F targets each composed of 9 individual point scatters (0.1 m spacing)
  Target offset: 0.625 m (spacing between each F target)
  Frequency: 10-20 GHz (1024 uniform samples)
Array Type 1:1:200

Figure 14:
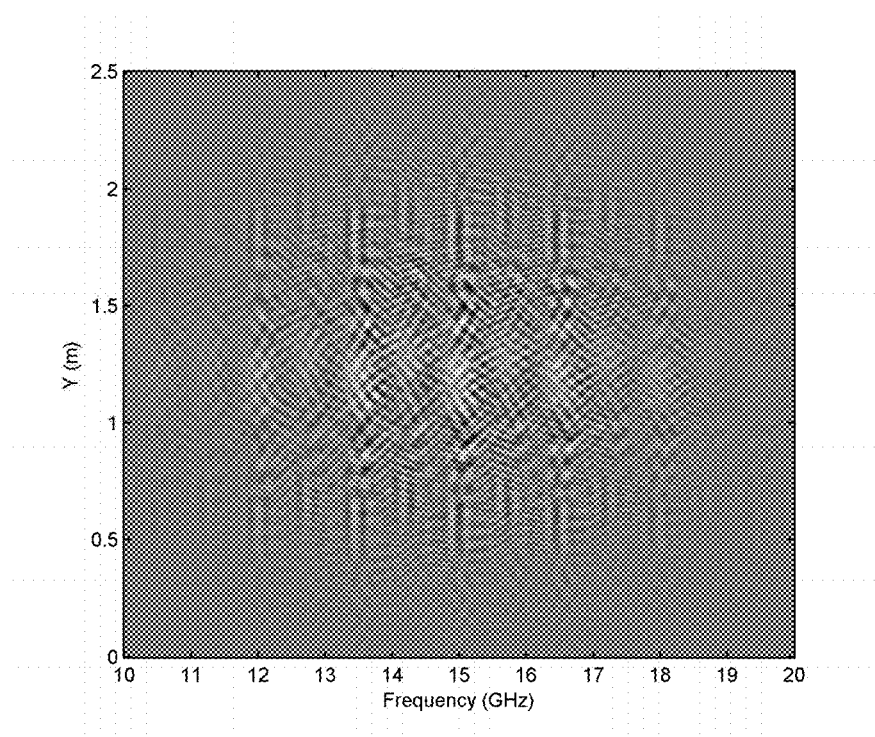
FIG. 14 shows the phase history data for a 1:1:200 array, in accordance with one embodiment of the present invention.
Figure 15:
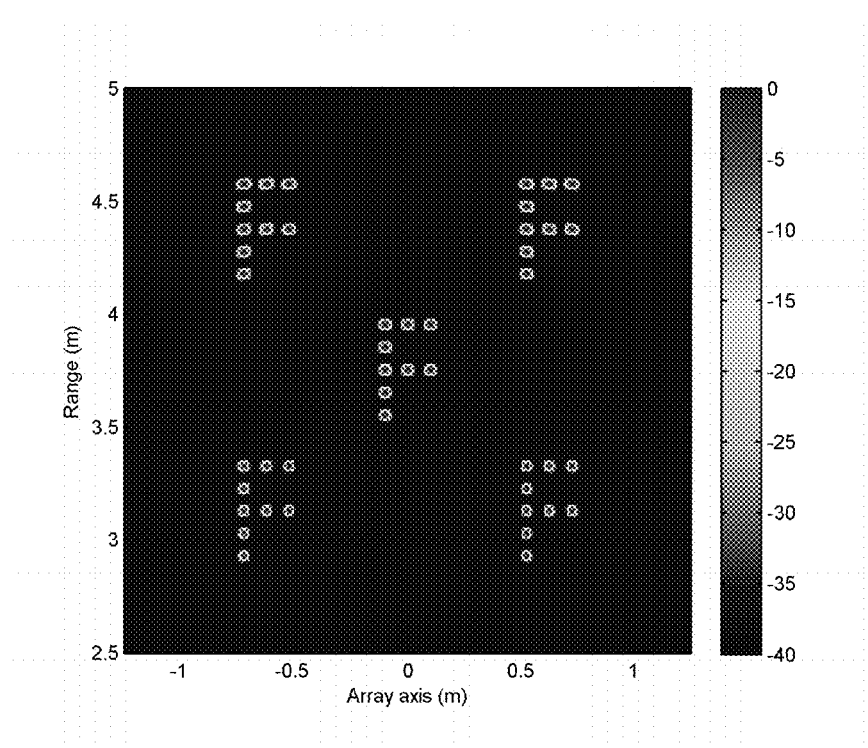
FIG. 15 shows the reconstructed image for the 1:1:200 array using the RD-GSAFT technique, in accordance with one embodiment of the present invention.
Figure 16:
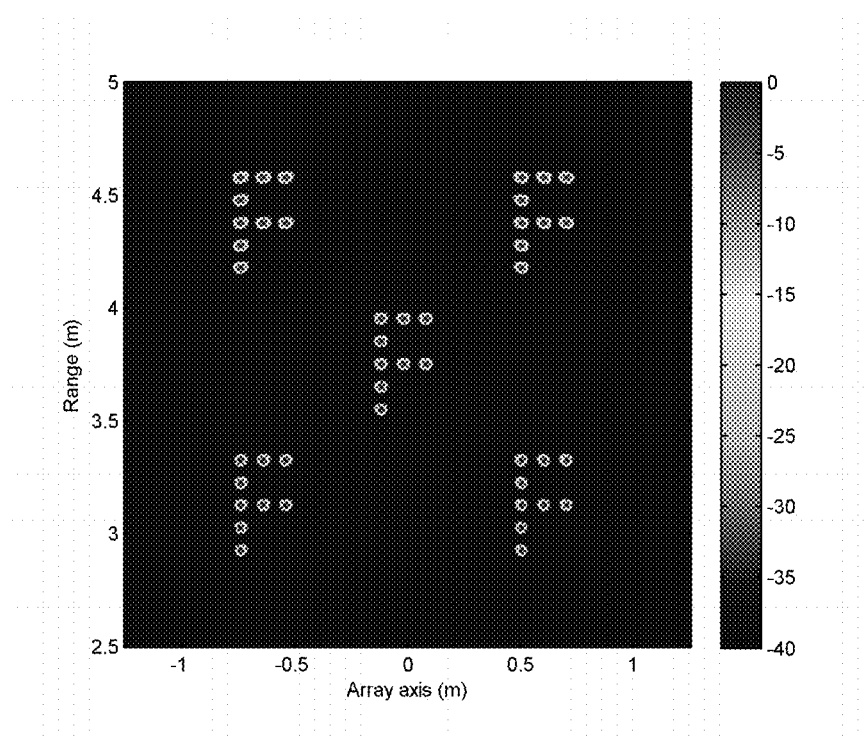
FIG. 16 shows the reconstructed image for the 1:1:200 array using the FFT-based SAR technique, in accordance with one embodiment of the present invention.

The first array type simulated is a 1:1:200 array. This array is equivalent to the separate transmit-receive array and has essentially no error due to baseline separation of the T and R elements since each the path for each pairing is essentially the same. This array will have uniform spacing with 401 sample points from a total of 201 T antennas and 201 R antennas for approximately 1.0 samples/antenna. The effective sample spacing is 6.25 mm (0.31λ). The phase-history for this data is shown in FIG. 14. Note that this data is demodulated to remove the phase shift due to the range at the center of the image region (i.e. 2 times 3.75 m round trip path length). This data was focused using the RD-GSAFT technique over an image space of 2.5 m by 2.5 m composed of 301 pixels by 301 pixels. The reconstructed (focused) image is shown in FIG. 15 on a pseudo-color log scale with 40 dB of dynamic range. The SAR image reconstruction was composed of 401 by 512 pixels over the same space and is shown in FIG. 16. Both reconstruction techniques provide diffraction limited imaging performance in this case with negligible imaging artifacts and effectively identical performance. Similar performance is expected in this case since the quasi-monostatic approximation is nearly perfectly satisfied.

Array Type 3:4:11

Figure 17:
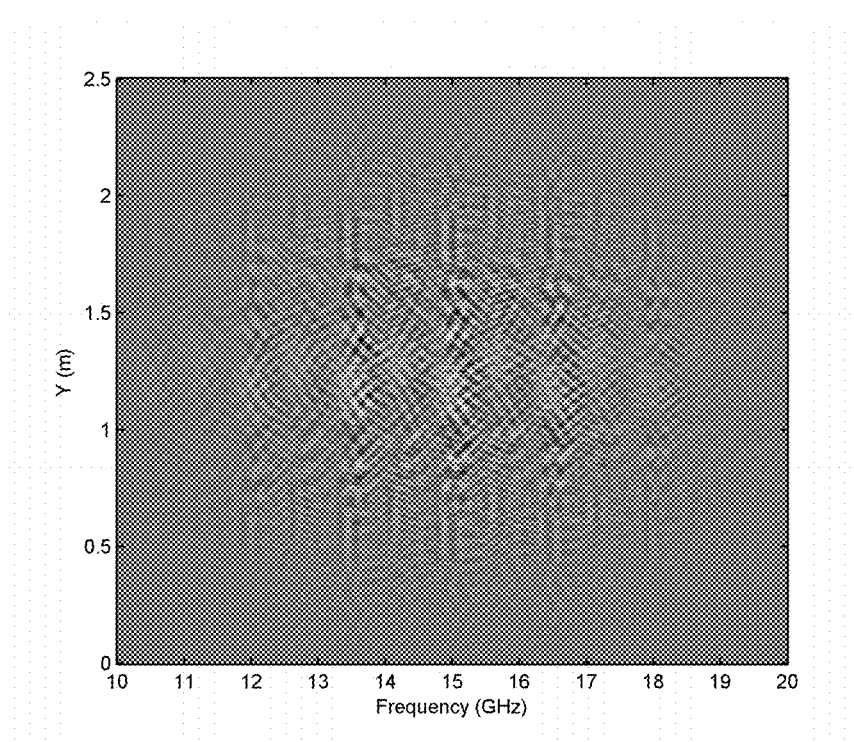
FIG. 17 shows the phase history data for a 3:4:11 array, in accordance with one embodiment of the present invention.
Figure 18:
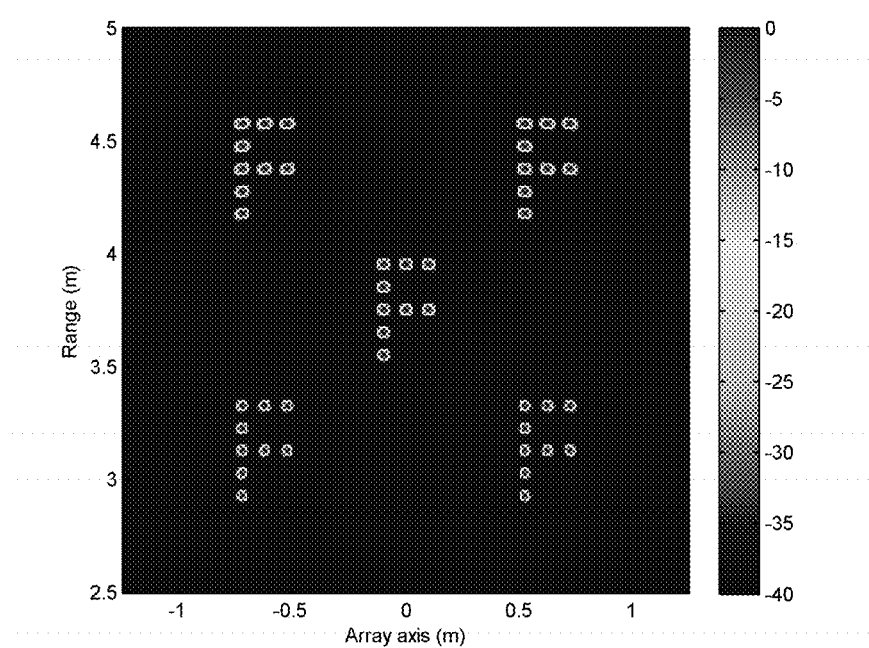
FIG. 18 shows the reconstructed image for the 3:4:11 array using the RD-GSAFT technique, in accordance with one embodiment of the present invention.
Figure 19:
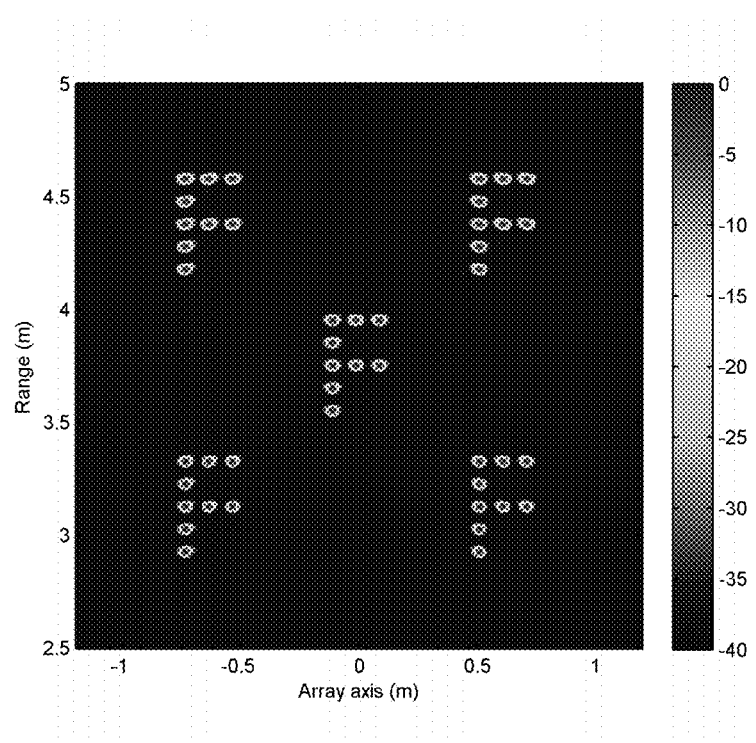
FIG. 19 shows the reconstructed image for the 3:4:11 array using the FFT-based SAR technique.

The next array type simulated is a 3:4:11 array. This array will realized 259 sample points from a total of 34 T antennas and 45 R antennas for approximately 3.27 samples/antenna. The effective sample spacing is 9.47 mm (0.472). The phase-history for this data is shown in FIG. 17. Note that this data is demodulated to remove the phase shift due to the range at the center of the image region (i.e. 2 times 3.75 m round trip path length). This data was focused using the RD-GSAFT technique over an image space of 2.5 m by 2.5 m composed of 301 pixels by 301 pixels. The reconstructed (focused) image is shown in FIG. 18 on a pseudo-color log scale with 40 dB of dynamic range. The SAR image reconstruction was composed of 401 by 512 pixels over the same space and is shown in FIG. 19. Both reconstruction techniques provide diffraction limited imaging performance in this case with negligible imaging artifacts and effectively identical performance. This illustrates that the sparse multi-static array imaging technique is effective at substantially reducing antenna and switch requirements.

The multi-static linear array apparatus and method can be extended to two dimensional arrays that cover either a planar or cylindrical aperture. In one embodiment, this may be done by placing transmit antennas over the aperture with a uniform spacing in each spatial dimension, and placing receive antennas over the aperture with a uniform spacing in each spatial dimension that is different than the transmitter spacing. As with the linear array technique described above, the array aperture may be divided into a number of unit cells, now in a two dimensional grid. As an example, the number of unit cells in the x and y dimensions are denoted $N_{c,x}$ and $N_{c,y}$. Each unit cell will have $N_{1x} N_{1y}$ transmitters spaced uniformly in the x and y dimensions, respectively. Each unit cell will also have $N_{2x}$ by $N_{2y}$ receivers spaced uniformly in the x and y dimensions, respectively. The relationships between $N_{1x}$ $N_{2x}$ between $N_{1y}$ and $N_{2y}$ may be the same as defined above for linear arrays with $N_1$ and $N_2$ chosen to have no common factors, and the relationship set by having $N_1$ and $N_2$ differ by one. This arrangement makes the array periodic in both the x and y dimensions with the periods set by the number of unit cells in each dimension. Therefore, the overall array is described by $N_{1x}:N_{2x}:N_{c,x}$ by $N_{1y}:N_{2y}:N_{c,y}$. This two dimensional planar array technique could also be trivially extended to cylindrical apertures by replacing either the x or y dimensions with the angular dimension.

Figure 20:
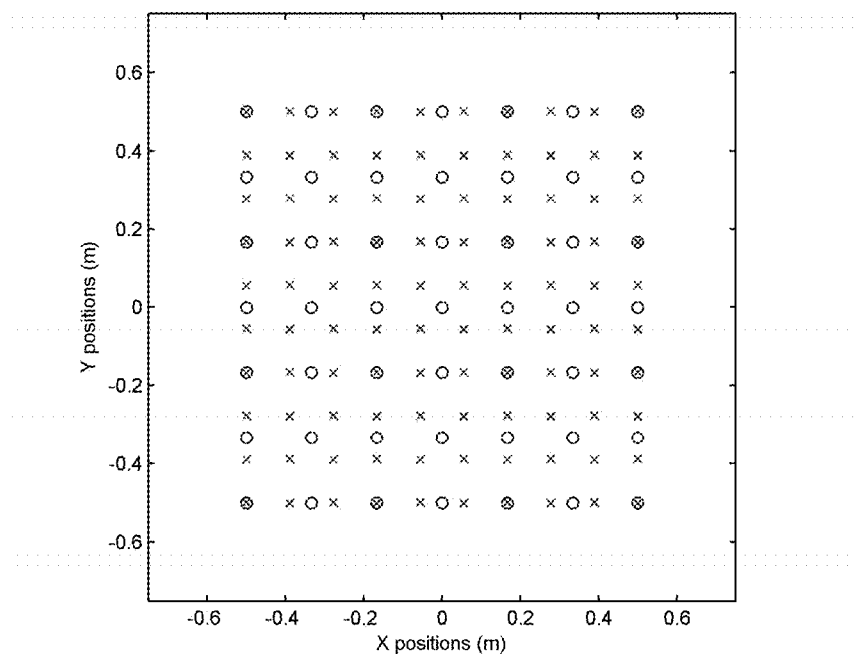
FIG. 20 illustrates transmitter and receiver antenna placements for a two-dimensional 2:3:3 by 2:3:3 array, in accordance with one embodiment of the present invention.
Figure 21:
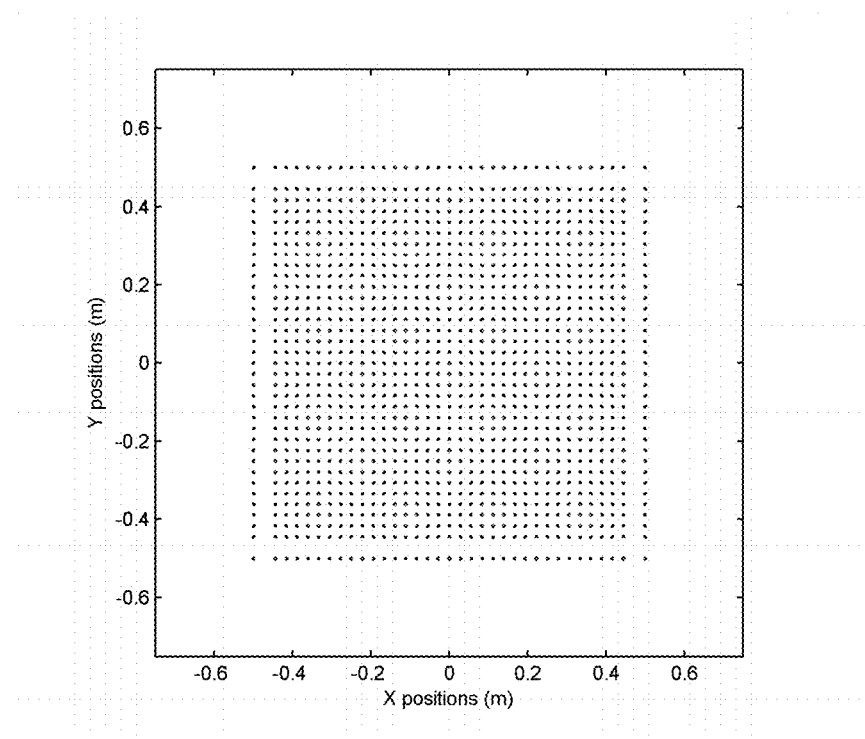
FIG. 21 illustrates effective sample locations for a two-dimensional 2:3:3 by 2:3:3 array, in accordance with one embodiment of the present invention.

This two-dimensional multi-static technique is demonstrated in FIGS. 20-21 for a 1 unit by 1 unit array, in accordance with one embodiment of the present invention. The array in the example of FIG. 20 is divided into a grid of 3 by 3 unit cells with 2 by 2 transmitters and 3 by 3 receivers in each unit cell. This array is therefore denoted as a 2:3:3 by 2:3:3 array. In FIG. 20, the placement of the transmitters is shown as o's and the placement of receivers as x's. Transmitters and receivers that are co-located are shown as an "x" inside of an "o". The effective sampling obtained using this array is shown in FIG. 21. Note that the sampling is uniform except for the outer two bands of samples. The sampling density is determined by the same formulas as for the linear array technique. The number of samples obtained within each unit cell is $2N_{1x}N_{2x}$ by $2N_{1y}N_{2y}$, or 12 by 12 in this case. The overall sampling for the array shown in FIG. 21 is therefore 36 by 36 if the missing samples are disregarded, or 34 by 34 if the uniform sampling region is considered. This represents a significant increase in sampling relative to the number of antennas required. The array shown in the example of FIG. 21 uses a grid of 7 by 7 transmitters and a grid of 10 by 10 receivers for a total number of antennas equal to 149. The uniformly sampled region has 34 by 34 (1156) samples, so the number of samples per antenna is approximately 8. Larger values of $N_1$ and $N_2$ will dramatically increase this number of samples per antenna.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

I claim:

1. A sequentially switched linear array apparatus for synthetic imaging of an object comprising:
   a. a first column linear array including a plurality of transmitter elements spaced apart by a first distance; and
   b. a second column linear array including a plurality of receiver elements spaced apart by a second distance, such that the first distance and the second distance are different and effective samples are obtained at a location approximately half-way between individual transmitter and receiver pairs of the plurality of transmitter and receiver elements, and wherein the first and second linear arrays are repeated as a group every unit cell length in a periodic fashion.

2. The apparatus of claim 1 wherein the number of effective samples obtained is at least twice the number of the plurality of transmitter and receiver elements in both arrays.

3. The apparatus of claim 2 wherein the periodicity achieves uniform sampling across each unit cell length.

4. The apparatus of claim 1 wherein the samples obtained by the transmitter elements and the receiver elements are tightly spaced by a fraction of a wavelength.

5. The apparatus of claim 1 wherein the elements operate in the 200 MHz-1 THz range.

6. The apparatus of claim 1 wherein the elements electronically scan one line of a planar or cylindrical aperture.

7. The apparatus of claim 6 wherein the aperture is approximately 0.1 to approximately 20 meters in height.

8. The apparatus of claim 2 wherein each transmitter element in the first column is spaced apart a distance approximately equal to the unit cell length divided by the number of transmitter elements, and each receiver element in the second column is spaced apart a distance approximately equal to the unit cell length divided by the number of receiver elements.

9. The apparatus of claim 1 wherein each transmitter element and each receiver element is used multiple times to obtain multiple samples per unit cell.

10. A sequentially switched linear array apparatus for synthetic imaging of an object comprising:
   a. a first column linear array including a plurality of transmitter elements spaced apart by a first distance in a first column;
   b. a second column linear array including a plurality of receiver elements spaced apart by a second distance in a second column, wherein the first distance and the second distance are different; and
   c. a single column of effective samples obtained by the transmitter elements and the receiver elements from individual transmitter and receiver pairs of the plurality of transmitter and receiver elements, wherein the plurality of transmitter elements and the plurality of receiver elements are repeated as a group every unit cell length in a periodic fashion, and wherein the periodicity achieves uniform sampling across each unit cell length.

11. The apparatus of claim 10 wherein each transmitter element and each receiver element is used multiple times to obtain multiple samples per unit cell.

12. The apparatus of claim 10 wherein each transmitter element in the first column is spaced apart a distance approximately equal to the unit cell length divided by the number of transmitter elements, and each receiver element in the second column is spaced apart a distance approximately equal to the unit cell length divided by the number of receiver elements.

13. A method of synthetic imaging of an object using sequentially switched linear arrays comprising:
   a. providing a first column linear array including a plurality of transmitter elements spaced apart by a first distance in a first column;
   b. providing a second column linear array including a plurality of receiver elements spaced apart by a second distance in a second column, wherein the first distance and the second distance are different;
   c. obtaining a single column of effective samples from individual transmitter and receiver pairs of the plurality of transmitter elements and receiver elements;
   d. repeating as a group the plurality of transmitter elements and the plurality of receiver elements every unit cell length in a periodic fashion; and
   e. achieving uniform sampling across each unit cell length.

14. The method of claim 13 further comprising using each of the transmitter elements and each of the receiver elements multiple times to obtain multiple samples per unit cell.

15. The method of claim 13 wherein each transmitter element in the first column is spaced apart a distance approximately equal to the unit cell length divided by the number of transmitter elements, and each receiver element in the second column is spaced apart a distance approximately equal to the unit cell length divided by the number of receiver elements.

16. A sequentially switched linear array apparatus for synthetic imaging of an object comprising:
   a. a first column linear array including a plurality of transmitter elements spaced apart uniformly in a first spatial dimension and a second spatial dimension; and
   b. a second column linear array including a plurality of receiver elements spaced apart uniformly in the first spatial dimension and the second spatial dimension, such that the uniform spacings of the receiver elements are different from the uniform spacings of the transmitter elements, wherein the first and second linear arrays are repeated as a group every unit cell length in a periodic fashion.

17. The apparatus of claim 16 wherein the first spatial dimension corresponds to the X-direction of a two-dimensional array, and the second spatial dimension corresponds to the Y-direction of the two-dimensional array.

18. The apparatus of claim 17 wherein the plurality of transmitter elements and the plurality of receiver elements are repeated in both the X-dimension and the Y-dimension, wherein the periods are set by the number of unit cells in each dimension.

19. The apparatus of claim 17 wherein at least one transmitter element and receiver element are co-located at vertices of each unit cell.

* * * * *